United States Patent [19]

Howell

[11] Patent Number: 4,724,934
[45] Date of Patent: Feb. 16, 1988

[54] BRAKE TORQUE CONTROL MECHANISM
[75] Inventor: Jerry F. Howell, New Carlisle, Ohio
[73] Assignee: General Motors Corporation, Detroit, Mich.
[21] Appl. No.: 881,727
[22] Filed: Jul. 3, 1986
[51] Int. Cl.[4] ............................................. F16D 65/14
[52] U.S. Cl. .............................. 188/73.45; 188/72.2; 188/72.4; 188/370; 188/181 T; 303/100; 303/112
[58] Field of Search ............... 188/73.44, 73.45, 73.43, 188/72.4, 72.5, 370, 15 LA, 181 T; 303/100, 112

[56] References Cited
U.S. PATENT DOCUMENTS 4,553,644 11/1985 Folch .................................. 188/72.4
4,574,922 3/1986 Varin et al. ................... 188/73.45 X Primary Examiner—Joseph Falk
Attorney, Agent, or Firm—D. D. McGraw

[57] ABSTRACT

A disc brake caliper is mounted with a rollpin or similar sleeve secured between the brake torque transmitting member and the brake torque receiving member. The rollpin sleeve is also positioned about the brake hose applying braking pressure to the caliper assembly so that when brake actuation occurs the caliper brake torque reaction compresses the rollpin, closing the brake hose passage completely when the maximum permissible braking torque is exerted. Thus the brake actuating pressure and the resulting braking effort are limited so that the wheel does not reach incipient wheel lock at maximum allowable braking effort on dry pavement.

10 Claims, 8 Drawing Figures

BRAKE TORQUE CONTROL MECHANISM

The invention relates to a disc brake caliper mounting arrangement in which the mounting mechanism includes mechanism which also controls the application of brake actuating pressure to the caliper in response to brake torque reaction and therefore limits the amount of brake torque exerted, this limitation being so arranged that the maximum braking torque does not exceed the maximum braking torque which can be exerted by the vehicle wheel on a dry, high friction road surface such as dry payment or asphalt.

The invention more particularly relates to a hydraulic braking pressure actuated brake having a brake torque receiving member and a braking torque transmitting member mounted to operatively transmit braking torque therebetween when the brake is actuated. The receiving member and the transmitting member have facing surfaces which operatively receive braking torque transmitting and control means therebetween. The braking torque transmitting and control means includes a resiliently deformable section which is resiliently deformable in accordance with the amount of braking torque being transmitted therethrough above a preset braking torque value. The brake actuating pressure control mechanism is part of the braking torque transmitting and control means, and may also be part of the resiliently deformable section. It is responsive to the braking torque-loaded deformation of the resiliently deformable section to limit the hydraulic brake pressure being delivered to the brake for brake actuation. The limitation of the brake actuating pressure therefore limits the maximum braking torque generated by the brake during actuation when the braking torque being so generated and transmitted increases to a predetermined maximum braking torque value which it is desired to never exceed.

The resiliently deformable section includes a sleeve which is preferably made as a roll-pin arrangement forming a longitudinally split sleeve. The split-edge surfaces of the sleeve may be overlapped so that the outer one slides over the inner one as the sleeve is deformed as its initial resistance to deformation is overcome with increasing brake torque, causing the inner diameter of the sleeve to be decreased. In other arrangements the split-edge surfaces may be arcuately spaced apart and more closely approach each other as brake torque is increased and the sleeve is compressed. In still other arrangements the split-edge surfaces may be beveled and normally in engagement with each other, so that the bevel angle of the engaged edge surfaces and the finish of those surfaces control the amount of compressive force exerted by the brake torque being transmitted therethrough before one split-edge surface rises over the other and is then in overlapping position.

The brake actuating pressure control means is preferably a resilient brake hose which supplies brake actuating pressure to the brake for actuation. The hose preferably extends through the sleeve with its outer surface in contact with the inner surface of the sleeve. Thus radial compression or deformation of the sleeve will cause the hose to compress or deform and the passage through the hose to decrease in effective diameter. A solid member such as a rod is preferably positioned in the hose passage so that as the hose inner surface decreases in effective diameter, the cross-section of the passage through which brake fluid and actuating pressure travels is decreased and initiates restriction to the flow of fluid after a preset increase in brake actuating pressure. At some predetermined brake torque which causes sufficient deformation of the split sleeve and the hose, the mechanism completely closes off the passage by full engagement of the hose inner surface with the rod-like solid member's outer surface. At this point the brake torque reaction being transmitted through the sleeve, hose and rod is sufficient to keep the passage closed so that no further brake actuating pressure can be delivered to the brake. Therefore the brake cannot exert any additional brake torque and the brake torque is effectively limited. It is preferable that the initial compression and decrease in effective inner diameter of the hose occurs at some predetermined brake torque, which may be the maximum desirable torque at a somewhat lesser friction coefficient road surface, and that the hose is fully collapsed against the rod-like solid member at a higher predetermined brake torque. This predetermined brake torque is preferably chosen so that it is somewhat less than the maximum allowable brake torque for the brake when the vehicle being braked is traveling on a high friction road surface such as dry concrete or asphalt. Because of hysterisis effects, the fine degree of control required to set this torque at the absolute maximum allowable brake torque, and even minor variations in vehicles, brakes, etc., it is much preferably to remain definitely on the desired side of a wheel slip curve to obviate the possibility of overshooting and entering a rapidly degrading brake affect as wheel slip dramatically increases toward full wheel lock or 100 percent slip. Because of brake balance, dynamic weight distributions and brake capacities any minor decrease in maximum rear wheel braking will be compensated for by the front wheel brakes, with only another pound or two of brake pedal pressure at most. The arrangement embodying the invention therefore limits the maximum braking force of the wheel to a value where incipient wheel lock will not be approached when braking on such road surfaces. The system will have no brake torque limiting effect on the increase in braking pressure so long as the desired maximum brake torque value is not attained.

Figure 1:
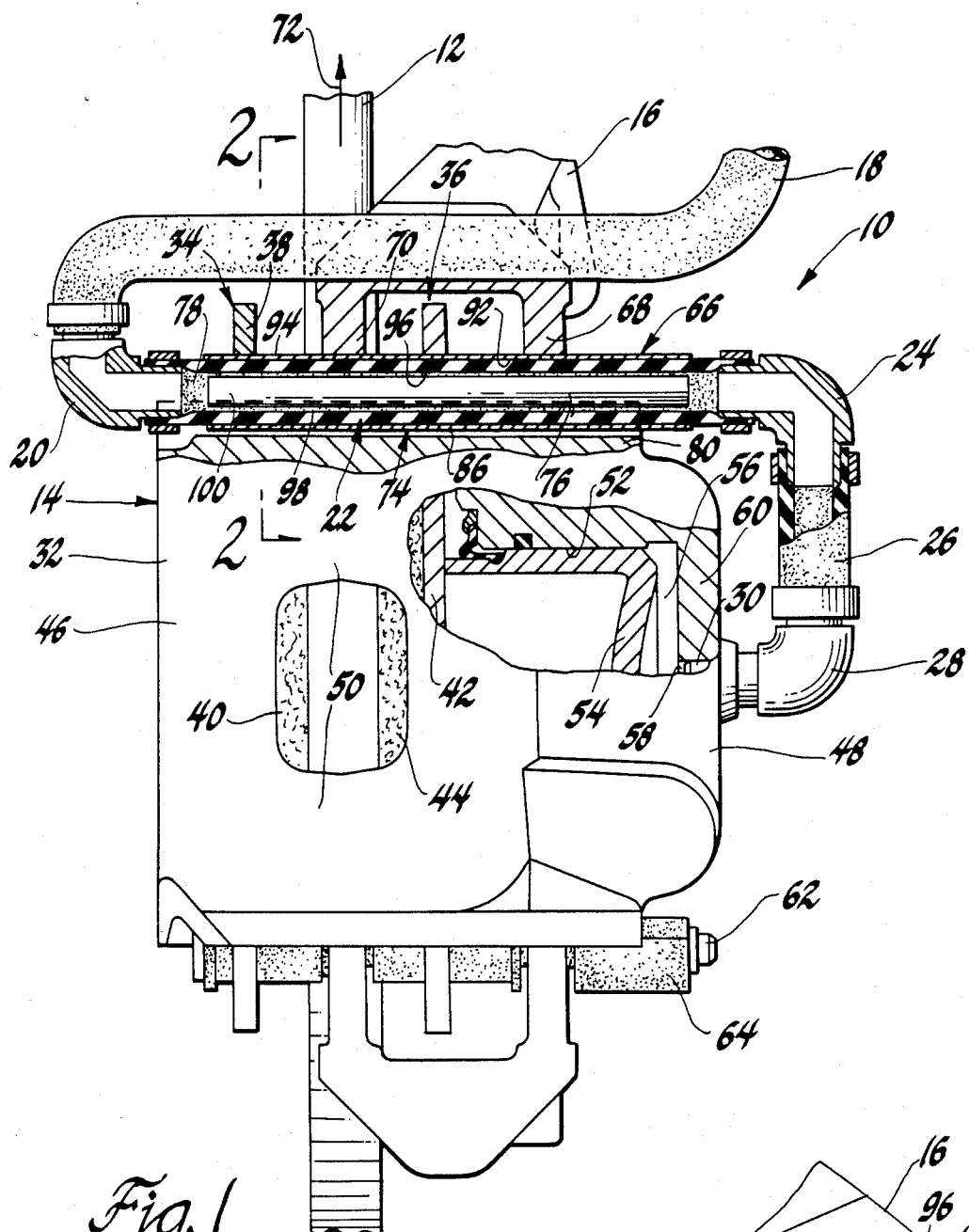
FIG. 1 is a plan view of a disc brake assembly embodying the invention with parts broken away and in section.

The brake assembly 10 shown in FIG. 1 is a typical sliding caliper disc brake assembly of the type in current common use in automotive vehicles. The assembly 10 includes a disc 12 to be braked. As is well known in the art, the disc 12 is suitably connected to a vehicle wheel which is in contact with the road surface on which the vehicle is traveling or resting. Assembly 10 also includes a caliper assembly 14, caliper mounting bracket 16, and an arrangement for connecting the brake actuating pressure supply hose 18 so that brake pressure transmitted therethrough actuates the brake assembly.

This arrangement is somewhat different from the relatively simple connection ordinarily used, because of the claimed invention. It is illustrated as including a coupling 20, a hose section 22, another coupling 24, another hose section 26, another coupling 28, and a fitting 30.

The caliper assembly 14 also includes the caliper housing 32, the outboard brake shoe assembly 34, and the inboard brake shoe assembly 36. The shoe assembly 34 includes a backing plate 38 and brake friction material 40. The shoe assembly 36 includes a similar backing plate 42 and brake friction material 44. The brake friction materials 40 and 44 are positioned and arranged for friction braking engagement with opposite sides of the disc 12, as is well known in the art. The ends of the shoe backing plates are also arranged to transmit braking torque to the caliper housing, as is also well known in the art.

The caliper housing is generally U-shaped in cross-section and includes an outboard leg 46 and an inboard leg 48 joined by a caliper bridge section 50. The outboard brake shoe assembly 34 is suitably mounted on the outboard leg 46. The inboard brake shoe assembly 36 is suitably mounted adjacent the inboard leg 48 for transverse movement toward and away from the disc 12. Inboard leg 48 has a cylinder 52 formed therein in which the piston 54 is sealingly and slidably mounted. The cylinder and piston form a brake actuating chamber 56 to which fitting 30 is suitably connected through an opening 58. In the brake illustrated, opening 58 is formed through the cylinder end wall 60.

When brake actuating pressure is applied through supply hose 18 it is conducted by the coupling and hose sections to chamber 56, where it acts on piston 54 and the cylinder end wall 60 to move the piston 54 leftwardly as seen in FIG. 1 and force the inboard brake shoe assembly 36 into friction braking engagement with one side of disc 12. It also urges the cylinder end wall 60, and therefore the entire caliper housing 32, rightwardly as seen in FIG. 1 so that the outboard brake shoe assembly 34 is urged into friction braking engagement with the other side of disc 12. Upon release suitable retracting mechanism may act to move the brake shoe assemblies away from braking engagement with disc 12. This general arrangement of actuation of a sliding caliper disc brake is well known in the art. The caliper assembly 14 is retained and guided in sliding position on the mounting bracket 16 by a pin 62 and sleeve 64 at one end and by the brake torque transmitting and control member 66 at the other end. Member 66 will be described in further detail.

The mounting bracket 16 is illustrated as having two laterally spaced brake torque receiving members 68 and 70 positioned at either end of the caliper housing 32 and forming brake torque receiving means. In some brakes, only one wider member is used. The arrow 72 indicates the rotational direction of disc 12 when the vehicle is traveling in the forward direction. When the brake is actuated while the vehicle is so traveling, the brake receiving torque members 68 and 70 receive brake torque, sometimes referred to as brake torque or braking force reaction, from the caliper housing through the brake torque transmitting and control member 66. When the vehicle is being braked while traveling in the reverse direction, similar brake torque receiving members at the other end of the caliper housing receive the torque reaction and transmit it to the vehicle through the mounting bracket 16.

The brake torque transmitting and control member 66 is comprised of the resiliently deformable hose section 22, a sleeve casing 74, and a suitably formed solid member 76 inserted in the passage 78 of the hose section 22. The sleeve casing 74 extends laterally of the caliper assembly beyond the brake torque receiving members 68 and 70 and the brake torque transmitting member 80 of the caliper housing 32, and is in engagement with members 68, 70 and 80 so that it may transmit brake torque reaction therebetween when braking while the vehicle is traveling in the forward direction. Brake torque transmitting member 80, better illustrated in cross-section in FIG. 2, includes a groove 82 having a face 84 which is in engagement with the casing outer wall 86. The brake torque receiving members 68 and 70, with member 70 being illustrated in FIG. 2, each has a groove or recess 88 defined by a groove face 90 which is also in engagement with the casing outer wall 86. The casing inner wall 92 fits about and is in engagement with the outer wall 94 of the hose section 22. Sleeve casing 74 permits the caliper housing 32 to slide laterally during brake apply and release, as do pin 62 and sleeve 64.

The inner wall 96 of hose section 22 defines passage 78. As can be seen in FIG. 1, one end of coupling 20 is secured to one end of hose section 22 by extending into one of passage 78 and being clamped thereto. In a similar manner, one end of coupling 24 connects with the other end of passage 78 and is secured to the end of hose section 22. The solid member 76 is illustrated as a rod having a length approximately equal to the length of sleeve casing 74 and a diameter which is somewhat less than the diameter of passage 78. Solid member 76 is inserted into the hole section before one of the couplings 20 and 24 is secured to the end of the hole section. The rod is held in position by the couplings 20 to the extent that it cannot move axially sufficiently far in either direction so as to no longer be positioned between the brake torque receiving members 68 and 70 and the brake torque transmitting member 80. At the same time, it will not further restrict passage 78 as it abuts the turn in coupling 20 or 24 should it move axially sufficiently far to make such contact. Passage 78 therefore becomes an annular passage section 98 throughout the length of the solid member 76. The cross-section area of passage section 98 is purposely kept sufficiently large to permit the normal passage of braking actuating pressure and fluid toward and from the chamber 56 of the caliper housing 32. By this arrangement, the inner wall 96 of the hose section 22 and the outer surface 100 of solid member 76 are in transverse alignment with the outer wall 94 of the hose section 22, the inner wall 92 and outer wall 86 of the casing 74, the brake torque transmitting member 80, and the brake torque receiving members 68 and 70.

Figure 3:
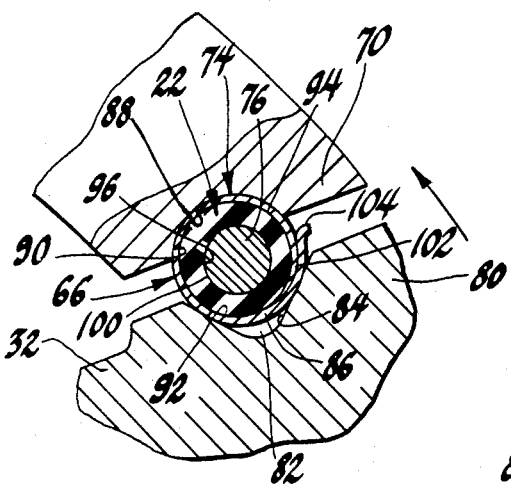
FIG. 3 is similar to FIG. 2 and shows the brake torque transmitting and control means when sufficient brake torque is being transmitted to close off the brake actuating pressure hose passage and therefore prevent further increase in brake actuating pressure being delivered to the brake.
Figure 4:
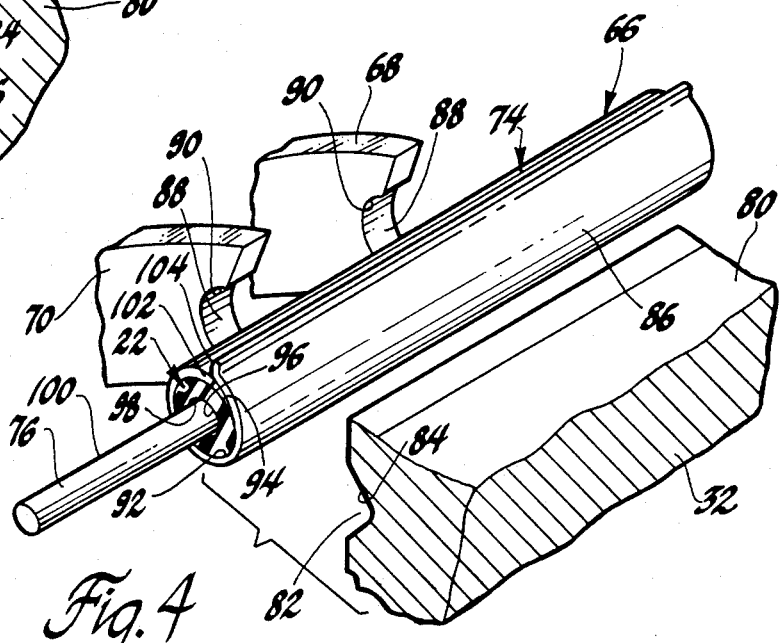
FIG. 4 is a fragmentary perspective view showing the brake torque transmitting and control means in position between the brake torque transmitting member and the brake torque receiving member, with parts broken away and in section.

As is more particularly illustrated in FIG. 3, it can be seen that the radial compression of the resiliently deformable hose section 22 and sleeve casing 74 may result in the hose section inner wall 96 decreasing in diameter until it is in sealing engagement with the outer surface 100 of the solid member 76. As this occurs, the effective cross-section area of the annular passage 98 decreases and is eventually reduced to a full closure. As will be further described below, this closure occurs at a value of the brake torque transmitted by the brake torque transmitting member 80 through the brake torque transmitting and control members 66 to the brake torque receiving members 68 and 70 which is not to be exceeded. By preventing further brake actuating pressure increase from being delivered to chamber 56, the brake torque transmitting and control member 66 performs this function since it is sensitive to the brake torque being generated during braking.

Figure 2:
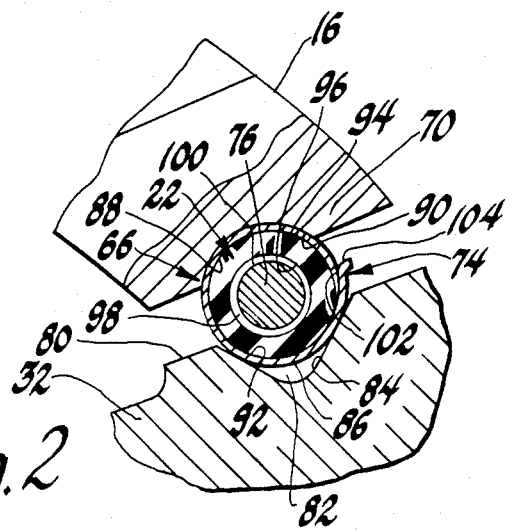
FIG. 2 is a fragmentary cross-section view taken in the direction of arrows 2—2 of FIG. 1 and more particularly illustrating the brake torque transmitting and control means when there is no brake torque being transmitted.

Sleeve casing 74 is illustrated in FIGS. 2 and 3 as having its split-edge surfaces 102 and 104 in an overlapping condition when the brake is in the release condition of operation. This is illustrated in FIG. 2. As brake torque is generated and transmitted from member 80 to members 68 and 70 through member 66, the sleeve casing 74 is deformed so that it is effectively reduced in diameter. This in turn causes the hose section 22 to be resiliently deformed, decreasing the effective cross section area of passage section 98 and eventually closing it off when the hose section inner wall 96 engages the solid member outer surface 100, as shown in FIG. 3. The sleeve casing 74, as well as the resilient and resistance to deformation of the hose section 22, may be cooperatively calibrated so that the point at which the cross section area passage section 98 begins to be reduced is at some desired brake torque value and the point at which passage section 98 is completely closed off occurs at another desired brake torque value which is the maximum brake torque that it is desired to have the brake exert at any time during braking operation.

The maximum braking torque is preferably established as a braking torque which is slightly less than the amount of braking torque obtained at the most efficient braking condition, which typically occurs with about 15 to 20 percent wheel slip. The reason for choosing a value which is slightly less than that maximum is that once the maximum is reached, only a slight additional braking force applied to the disc will cause the disc and wheel to decelerate much more rapidly, decreasing the maximum brake torque available because the wheel slip is increasing dramatically. As the wheel slip increases toward 100 percent slip from this maximum amount, the brake torque being generated at the point of contact of the vehicle wheel with the road surface decreases. It is therefore desirable to never let the maximum brake torque reach a maximum value and then begin to decrease. By keeping the preset maximum brake torque value to be achieved by the brake at slightly less than the theoretical maximum value, the system is assured to operate so that it does not reach beyond that theoretical maximum value under conditions of high friction coefficient between the vehicle wheel and the road surface. Such a condition is preferably that attainable when the road surface is a dry concrete or asphalt, typical of well maintained, dry roadways.

Figure 5:
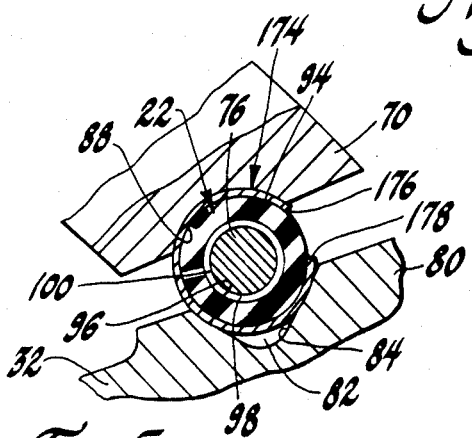
FIGS. 5 and 6 are respectively similar to FIGS. 2 and 3 and illustrate another embodiment of the invention.
Figure 6:
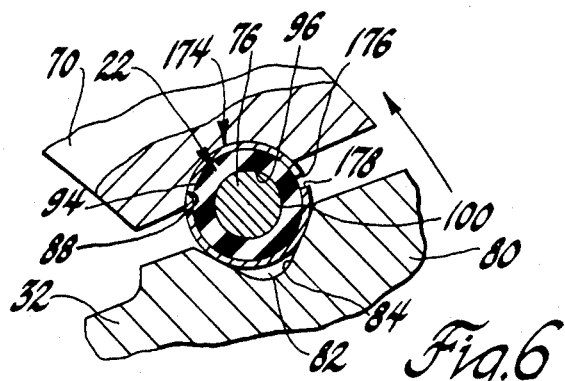

FIGS. 5 and 6 show a modified sleeve casing 174, with the split-edge surfaces 176 and 178 being spaced well apart when the brake is in the released position, shown in FIG. 5. When the maximum desired brake torque is reached, the split edge surfaces 176 and 178 have closely approached each other as shown in FIG. 6. As in the sleeve casing 74 of FIGS. 2 and 3, the sleeve may have an initial resistance to deformation as the brake torque or force transmitted therethrough is increased to a desired value, after which the sleeve begins to be deformed until it reaches the condition shown in FIG. 6.

Figure 7:
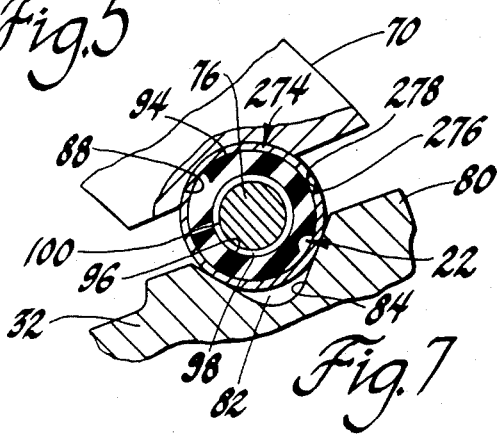
FIGS. 7 and 8 are also respectively similar to FIGS. 2 and 3 and illustrate still another embodiment of the invention.
Figure 8:
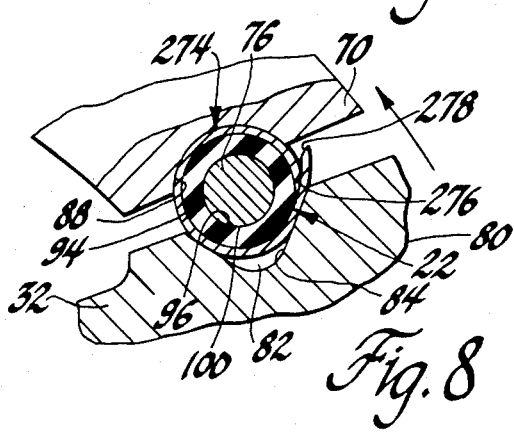

FIGS. 7 and 8 show still another sleeve casing arrangement in which sleeve casing 274 has beveled split-edge surfaces 276 and 278. In the brake release position, sleeve 274 is substantially circular in cross section, with the beveled edge surfaces 276 and 278 in beveled engagement so that the outer surface of the sleeve is substantially continuous. The beveled engagement of surfaces 276 and 278 results in a resistance to collapsive deformation of the sleeve 274 until the camming action of the beveled surfaces is overcome. Therefore the brake torque value at which the sleeve 274 begins to be deformed may be controlled, at least to a major extent, by the engagement of surfaces 276 and 278, particularly including the beveled angle formed by those surfaces. If the bevel is at a very small angle, for example, so that the beveled edge-surfaces extend through a relatively wide chordal portion of the sleeve, they will become disengaged so that they overlap as shown in FIG. 8 at a lower brake torque value exerted through sleeve 274 than if they are formed at a somewhat higher angle. Thus the beveled angle may be used to control the brake torque value point at which the sleeve begins to be deformed toward the condition shown in FIG. 8. Once the bevel surface 278 begins to move relative to the surface 276, it will slide out and over surface 276 to an overlapping condition as shown in FIG. 8. At the desired brake torque value, this deformation and decrease in effective diameter of sleeve casing 274 will be sufficient to close the hose passage section 98 in a manner similar to that described with regard to FIGS. 2 and 3.

The embodiments of the invention in which an exclusive property or privilege is claimed are defined as follows:

1. In a brake having hydraulic braking pressure actuated means for actuating said brake, hydraulic braking pressure for selectively actuating said means, a braking torque receiving member and a braking otrque transmitting member mounted to operatively transmit braking torque thereto when said brake is actuated, said receiving member and said transmitting member having facing surfaces, and braking torque-transmitting and control means operatively received between said facing surfaces, said braking torque-transmitting and control means comprising:

a resiliently deformable section being resiliently deformable in accordance with the amount of braking torque above a preset braking torque valve being operatively transmitted between said transmitting member and said receiving member when said brake is actuated, and brake actuating pressure control means defined at least in part by at least a portion of said resiliently deformable section and responsive to the braking torque-loaded resilient deformation of said deformable section to limit said hydraulic braking pressure actuating said brake and thus limit the maximum braking torque generated by said brake during actuation by said actuating pressure delivered to said hydraulic braking pressure actuated means when the braking torque being so generated and transmitted increases to a predetermined maximum braking torque value which it is desired to never exceed.

2. In a hydraulic braking pressure actuated disc brake having a mounting bracket, a brake caliper mounted thereon to operatively transmit braking torque thereto while said brake is actuated, said caliper having hydraulic braking pressure actuated means for selectively actuating said brake by hydraulic braking pressure supplied thereto, said mounting bracket and said caliper having facing surfaces with recesses formed therein, and braking torque-transmitting and control means received in said recesses, said braking torque-transmitting and control means comprising:

a resiliently deformable section fitting in said recesses and being resiliently deformable in accordance with the amount of braking torque above a predetermined intermediate value of the braking torque being operatively transmitted between said caliper and said mounting bracket while said brake is actuated, and brake actuating pressure control menas defined at least in part by a portion of said resiliently deformable section and responsive to the torque-loaded deformation of said resiliently deformable section to limit said hydraulic braking pressure supplied to said pressure actuated means and actuating the disc brake and therefore limit the maximum braking torque as the braking torque being operatively transmitted between said caliper and said mounting bracket increases to a predetermined maximum braking torque value which it is desired to never exceed.

3. In a hydraulic braking pressure actuated disc brake having a mounting bracket, a brake caliper operatively mounted thereon to operatively transmit brake torque thereto when said brake is actuated, said caliper having hydraulic braking pressure actuated means for selectively actuating said brake by hydraulic braking pressure supplied thereto, said mounting bracket and said brake caliper having facing surfaces with recesses formed therein, and braking torque-transmitting and control means received in said recesses, said braking torque-transmitting and control means comprising:

a resiliently deformable section fitting in said receesses and being resiliently deformable in accordance with the amount of braking torque above a predetermined intermediate value of braking torque being operatively transmitted between said brake caliper and said mounting bracket while said brake is actuated, and brake actuating pressure control means defined at least in part by at least a portion of said resiliently deformable section and responsive to the torque-loaded deformation of said resiliently deformable section to initially restrict and then ultimately limit said pressure actuating said disc brake and thus initially decrease the rate of braking torque increase and then ultimately limit the maximum braking torque that can be generated by said brake as the braking torque being operatively transmitted between said caliper and said mounting bracket increases to a predetermined maximum braking torque value which it is desired to never exceed.

4. For use in a hydraulic pressure actuated vehicle wheel brake having means responsive to hydraulic brake actuating pressure to actuate the brake in accordance with the amount of hydraulic pressure delivered thereto and thereby cause braking torque to be generated, the improvement of:

braking torque control mechanism comprising:

a braking torque transmitting member adapted to operatively transmit braking torque when the brake is actuated;

a braking torque receiving member adapted to operatively receive braking torque from said braking torque-transmitting member;

braking torque sensing means operatively positioned between said transmitting and receiving members, said sensing means being adapted to sense the braking torque operatively transmitted and received between said transmitting and receiving members and adapted to generate a signal corresponding to the value of the sensed braking torque;

and hydraulic brake actuating pressure control means adapted to be responsive to said signal and control the hydraulic brake actuating pressure delivered to the brake actuating means to limit the maximum attainable amount of braking torque that may be generated by the brake to a value no more than the maximum amount of braking torque generated by the brake that can be tolerated before causing incipient wheel lock.

5. For use in a hydraulic pressure actuated vehicle wheel brake having means responsive to hydraulic brake actuating pressure to actuate the brake in accordance with the amount of hydraulic pressure delivered thereto and thereby cause braking torque to be generated the improvement including:

brake braking torque control mechanism comprising:

a braking torque transmitting member adapted to transmit braking torque when the brake is actuated;

a braking torque receiving member adapted to operatively receive braking torque from said braking torque-transmitting member when the brake is actuated;

braking torque sensing means positioned between said transmitting and receiving members, said sensing means being adapted to sense the braking torque transmitted and received between said transmitting and receiving members and generate a signal corresponding to the value of the sensed braking torque;

and hydraulic brake actuating pressure control means adapted to be responsive to said signal and control the hydraulic brake actuating pressure delivered to the brake acutating means by initially decreasing the rate of hydraulic brake actuating pressure increase above a predetermined braking torque first value and then preventing further hydraulic brake actuating pressure increase above a predetermined higher braking torque second value to initially decrease the rate of braking torque increase and to then ultimately limit the maximum attainable amount of braking torque that may be generated by the brake to said predetermined higher braking torque second value which is no more than the maximum amount of braking torque generated by the brake that can be tolerated before causing incipient wheel lock.

6. For use in a hydraulic pressure actuated vehicle wheel brake for a vehicle wheel having a tire engaging a road surface, the vehicle wheel brake having means responsive to hydraulic brake actuating pressure to actuate the brake in accordance with the amount of hydraulic pressure delivered thereto and thereby cause braking torque to be generated, the improvement including:
- brake braking torque control mechanism comprising:
  - a braking torque-transmitting member adapted to transmit braking torque when the brake is actuated;
  - a braking torque receiving member operatively receiving braking torque from said braking torque-transmitting member when braking torque is transmitted therefrom;
  - braking torque sensing and hydraulic brake actuating pressure control means positioned between said transmitting and receiving members in braking torque transmittable relation therewith,
    - said sensing and control means being adapted to sense and respond to the braking torque operatively transmitted and received between said members and control the hydraulic brake actuating pressure delivered to the brake actuating means to prevent further hydraulic brake actuating pressure increase when a predetermined braking torque value is obtained and therefore to limit the maximum amount of braking torque that may be generated by the brake to that predetermined braking torque value, which value is less than the maximum amount of braking torque generated by the brake that can be tolerated by the interface engagement of the tire and the road surface before causing incipient wheel lock under maximum tire-to-road braking coefficient conditions.

7. For use in a hydraulic pressure actuated vehicle wheel brake for a vehicle wheel having a tire engaging a road surface, the vehicle wheel brake having means responsive to hydraulic brake actuating pressure to actuate the brake in accordance with the amount of hydraulic pressure delivered thereto and thereby cause braking torque to be generated, the improvement including:
- brake braking torque control mechanism comprising:
  - a braking torque-transmitting member adapted to transmit braking torque when the brake is actuated;
  - a braking torque receiving member operatively receiving braking torque from said braking torque-transmitting member when braking torque is transmitted therefrom;
  - braking torque sensing and hydraulic brake actuating pressure control means positioned between said transmitting and receiving members so as to be in the path of braking torque transmittal therebetween, said sensing and control means comprising:
    - a resilient brake hose having an inner wall defining a passage therethrough and adapted to conduct hydraulic brake actuating pressure to the vehicle wheel brake to actuate that brake,
    - a solid member in said passage positioned therein so as to be in the path of braking torque transmittal between said transmitting member and said receiving member, and member having a smaller cross section area than the cross section area of the portion of said passage in which it is located so as to define a cross section area of said passage which is sufficiently large to normally permit relatively free transmittal of hydraulic brake actuating pressure therethrough,
    - said brake hose inner wall and said solid member cooperating to define a valve adapted to control the transmittal of hydraulic brake actuating pressure through said brake hose by moving said brake hose inner wall toward said solid member and when said inner wall circumferentially engages said solid member closing said valve to prevent fluid flow therethrough,
    - and a resilient roll-pin-like longitudinally split sleeve casing surrounding a portion of said brake hose and located in operative torque-transmitting engageable relation with said transmitting member and said brake hose and said receiving member and adapted to transmit braking torque between said transmitting and receiving members transversely through said casing and said brake hose,
  - said casing and said brake hose being adapted to respond to braking torque transmitted therethrough and to be resiliently deformed at a predetermined braking torque
    - and reduce the opening of said valve through which hydraulic brake actuating pressure normally passes and upon a predetermined maximum braking torque value transmitted therethrough closing said valve
    - and thus control hydraulic brake actuating pressure delivered to the brake actuating means to prevent further hydraulic brake actuating pressure increase when the predetermined maximum braking torque value transmitted through said casing and said braking hose is obtained
    - and limit the maximum amount of braking torque that may be generated by the brake to the predetermined maximum braking torque value, which predetermined value is less than the maximum amount of braking torque generated by the brake that can be tolerated before causing incipient wheel lock under maximum tire-to-road braking coefficient conditions.

8. The mechanism of claim 7 in which the resistance to deformation of said casing and said brake hose by braking torque transmitted therethrough is preset so that deformation thereof which is sufficient to begin decreasing the passage cross section area occurs at an intermediate predetermined transmitted braking torque value
- and said hose passage inner wall is sufficiently decreased in diameter to engage said solid member and close off said passage at said predetermined maximum transmitted braking torque value,
- said casing and said brake hose returning toward their undeformed condition when the transmitted braking torque is thereafter decreased.

9. The mechanism of claim 7 in which said longitudinally split sleeve casing has adjacent but arcuately overlapping split-edge surfaces which permit the deformation of said casing to be a progressive decrease in effective casing inner diameter with an increase in braking torque above an intermediate predetermined transmitted braking torque value which is less than the predetermined maximum transmitted braking torque value.

10. The mechanism of claim 7 in which said longitudinally split sleeve casing has adjacent abutting beveled split-edge surfaces in mating beveled relation, the bevel angle being calibrated in accordance with the braking torque value at which said casing is to be deformed to achieve a snap-action decrease in effective casing inner diameter under the force of the braking torque being transmitted therethrough and cause said hose to be deformed by being compressed inwardly in a squeezing action to close off said passage and prevent further increase in brake actuating pressure delivered to the wheel brake.

* * * * *